Sept. 20, 1938.   F. X. LAMB   2,130,960
ELECTRICAL MEASURING INSTRUMENT
Filed Feb. 14, 1936
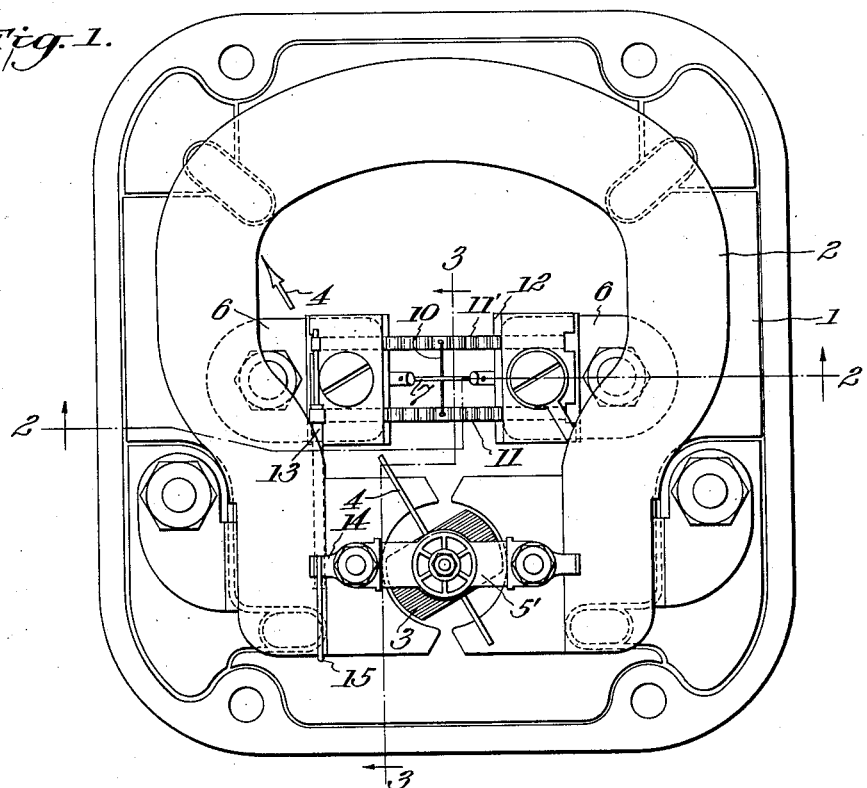
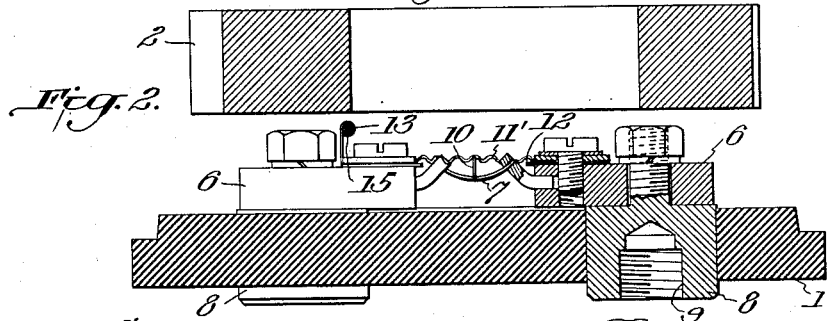
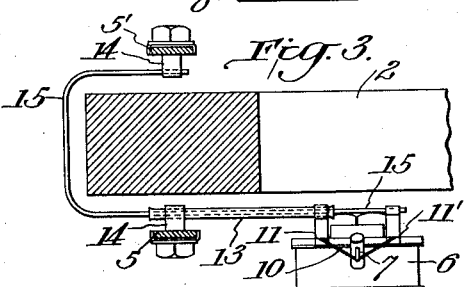
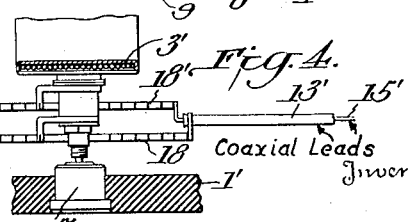
Coaxial Leads
Inventor:
Francis X. Lamb,
By Potter, Pierce & Scheffler,
Attorneys.

Patented Sept. 20, 1938

2,130,960

UNITED STATES PATENT OFFICE 2,130,960

ELECTRICAL MEASURING INSTRUMENT

Francis X. Lamb, East Orange, N. J., assignor to Weston Electrical Instrument Corporation, Newark, N. J., a corporation of New Jersey Application February 14, 1936, Serial No. 63,971

5 Claims. (Cl. 171—95)

This invention relates to electrical measuring instruments and particularly to instruments adapted for use in an electrical field, whether the field is produced by the circuit associated with the instrument or by some other circuit.

The problem of avoiding a pick-up of parasitic currents from stray electrical fields is particularly difficult in the design of thermal ammeters for use in the measurement of currents of a high radio frequency. The location of the heater element and thermocouple within the instrument casing results in a strong radio frequency field and, except by a careful restriction of the loop area of the direct current circuit to a small value, the alternating current induced in the direct current circuit will introduce errors and may rise to such values as to burn out the moving coil and the springs. Electric fields due to circuits external to the instrument may introduce further errors in instruments of this and other types.

An object of the invention is to provide electrical measuring instruments, for use in alternating or direct current measurements, in which the internal wiring of the instrument affords protection against a pick-up of stray currents from alternating electrical fields. An object is to provide an electrical measuring instrument including an enclosed thermoelectric converter, or heater element and thermocouple, and a direct current circuit between the thermocouple and the instrument movement; this circuit being so constructed as to avoid errors and/or damage when high frequency currents are passed through the heater element. More particularly, an object is to provide an electrical measuring instrument having a concentric wiring to avoid the pick-up of parasitic currents from electrical fields.

These and other objects and advantages of the invention will be apparent from the following specification when taken with the accompanying drawing in which:

Fig. 1 is a plan view of a thermal ammeter, as seen with the cover removed, which embodies this invention;

Figs. 2 and 3 are sectional views taken, respectively, on lines 2—2 and 3—3 of Fig. 1; and Fig. 4 is a fragmentary sectional view of a modified construction.

In the drawing, the reference numeral 1 identifies the instrument base on which the permanent magnet 2 and a moving system, including a coil 3 and pointer 4, are mounted. The moving system is pivotally supported on upper and lower brackets 5', 5, and the electrical connections to the coil are made through these brackets and the associated springs, not shown, in the usual manner.

The thermoelectric converter, or heater and thermocouple, may be of any convenient form. As illustrated, the relatively massive blocks 6 which carry the short heater element 7 are fitted upon threaded posts of the line or main circuit terminals 8 which extend through the insulating base 1 and have threaded bores 9 for receiving connecting screws or studs. The hot junction of the thermocouple 10 is at the midpoint of the heater element 7, and the cold ends are soldered to compensating strips 11, 11' which are carried by the heater terminal blocks 6. The compensating strips are electrically insulated from the blocks by thin mica sheets 12 which afford a good heat transfer between these parts.

The construction so far described is typical of present practice and the exact details form no part of the present invention. The connections between the thermocouple and moving coil may be made in various ways when the instrument will not be located in an electrical field, or used for the measurement of radio frequency currents. Special connections have been used in radio frequency ammeters to reduce the loop area of the direct current circuit to a small value but the constructions included several elements, usually for 10 to 14 parts, and were relatively expensive to manufacture and assemble.

In accordance with this invention, the loop area can be reduced to zero by the use of concentric conductors. A short, small diameter tubular conductor 13 is soldered to the upturned end of the compensating strip 11 and to a bracket 14 on the lower bridge 5. The tube 13 is supported by these soldered connections and the wire 15 is similarly supported by soldered connections to the compensating strip 11' and the bracket 14 on the upper bridge. The wire 15 extends through the tube 13 and is bent around the magnet 2 to reach the upper bridge. The wire 15 may be insulated from the tube 13 solely by a proper spacing of these parts, or an enamel or silk covering may be used on the wire.

The plane of the concentric conductors 13, 15 is preferably normal to the main circuit or current path between terminals 9, and the exposed ends of the wire 15 each have two sections so arranged as to neutralize any alternating currents which may be induced in the wire by the main circuit of the heater element. The capacitance between the tube and wire is beneficial since it is across the moving coil and therefore bypasses around the coil any alternating or radio frequency current which may arise in the circuit from any cause.

In the case of very high frequencies and/or where there are stray fields around the instrument, an increased protection against parasitic currents may be had by reducing the exposed portion of the central wire. One possible arrangement, as applied to a different type of coil mounting, is shown in Fig. 4. The coil 3' is mounted in a jewel bearing 17 on the insulating base 1', and the circuit connections to the coil are made through springs 18, 18' at this end of the coil. The ends of the springs are connected to the concentric leads 13', 15' and only a very short section of the wire 15' projects beyond the tube 13'.

While I have described the invention as applied to an ammeter of the type having an enclosed heater circuit which may be traversed by high frequency currents, it will be apparent that the concentric conductors may be used to advantage in instruments in which only an alternating or only a direct current is present. The two illustrated embodiments of the invention indicate that there is some latitude in the design and arrangement of the wiring and associated elements of the system and it is therefore to be understood that other variations which will occur to those familiar with the design and construction of electrical instruments fall within the scope of my invention as set forth in the following claims.

I claim:

1. An electrical measuring instrument adapted for use in the presence of high frequency fields, comprising a base, an indicating system on said base including a pointer and a coil through which direct current flows to actuate the pointer, a pair of terminals carried by said base, and coaxially arranged leads connecting said terminals to said coil, whereby the pick-up of parasitic currents from high frequency electric and magnetic fields by said leads is negligible.

2. An electrical measuring instrument adapted for use in the presence of high frequency fields, comprising a base, a magnet and a moving coil mounted on said base, a thermoelectric converter on said base and having one pair of terminals for connection to a main circuit and a second pair of terminals for connection to said coil, the terminals of said second pair being adjacent each other and symmetrically disposed with respect to a plane passed through said first pair of terminals, and connections including a tubular conductor and a wire coaxial therewith between said second pair of terminals and said coil.

3. An electrical measuring instrument as claimed in claim 2, wherein said tubular conductor and wire are in a plane normal to the plane passing through the first pair of terminals.

4. In a thermal ammeter adapted for use in the presence of high frequency fields, a base carrying a magnet and a moving coil, bridge members supporting said coil for pivotal movement, said bridge members serving as terminals for said coil, and leads for connecting said bridge members to a thermocouple; said leads comprising a tubular conductor connected to one bridge member, and a wire connected to the other bridge member and extended around said magnet to pass through the tubular conductor, whereby said leads prevent a pick-up of parasitic currents when the thermal ammeter is located in a high frequency field.

5. In an electrical instrument, a magnet having spaced pole pieces, a coil and means mounting the coil for pivotal movement in the gap between said pole pieces, a pair of springs at one end of said coil for making electrical connections to said coil, and a pair of concentrically arranged conductors terminating adjacent and connected to the respective springs, said concentric conductors precluding the pick-up of parasitic currents when said instrument is located in a high frequency electrical field.

FRANCIS X. LAMB.